United States Patent
Aston et al.

(10) Patent No.: US 10,844,263 B2
(45) Date of Patent: Nov. 24, 2020

(54) AQUEOUS-BASED WELLBORE FLUIDS

(75) Inventors: Mark Aston, Teddington (GB); Kenneth Richard Seddon, Donaghadee (GB); David Francis Wassell, Belfast (GB)

(73) Assignee: THE QUEEN'S UNIVERSITY BELFAST, Belfast (GB)

( * ) Notice: Subject to any disclaimer, the term of this patent is extended or adjusted under 35 U.S.C. 154(b) by 0 days.

(21) Appl. No.: 12/746,629

(22) PCT Filed: Nov. 27, 2008

(86) PCT No.: PCT/GB2008/003956
§ 371 (c)(1),
(2), (4) Date: Jun. 7, 2010

(87) PCT Pub. No.: WO2009/071873
PCT Pub. Date: Jun. 11, 2009

(65) Prior Publication Data
US 2010/0256019 A1   Oct. 7, 2010

(30) Foreign Application Priority Data

Dec. 7, 2007  (EP) .................................... 07254745

(51) Int. Cl.
*C09K 8/035* (2006.01)

(52) U.S. Cl.
CPC .......... *C09K 8/035* (2013.01); *C09K 2208/12* (2013.01)

(58) Field of Classification Search
CPC ................................... C09K 8/04; C09K 8/84
USPC ......................... 507/128, 129, 130, 135, 243
See application file for complete search history.

(56) References Cited

U.S. PATENT DOCUMENTS

| | | | | |
|---|---|---|---|---|
| 2,935,475 A * | 5/1960 | Bernard | ................ | C09K 8/607 166/305.1 |
| 3,664,807 A * | 5/1972 | Redmore | ................ | C02F 1/542 252/389.21 |
| 4,553,597 A * | 11/1985 | Le Ribault | ............. | C09K 8/607 166/305.1 |
| 5,323,855 A * | 6/1994 | Evans | ................ | E21B 43/2401 166/248 |
| 6,251,836 B1 * | 6/2001 | Duncum | ................. | C09K 8/52 507/123 |
| 6,350,721 B1 * | 2/2002 | Fu | ........................... | C09K 8/72 507/203 |
| 2002/0019317 A1 | 2/2002 | Palmer et al. | | |
| 2005/0256012 A1 * | 11/2005 | Smith | ......................... | 507/120 |
| 2006/0180308 A1 * | 8/2006 | Welton | ..................... | C09K 8/74 166/282 |
| 2007/0144186 A1 * | 6/2007 | Shiflett | ................. | C09K 5/047 62/112 |
| 2009/0029880 A1 * | 1/2009 | Berry et al. | ................. | 507/240 |

FOREIGN PATENT DOCUMENTS

| | | | |
|---|---|---|---|
| EP | 0 545 677 | 9/1993 | |
| WO | WO 2006/013596 | 2/2006 | |
| WO | WO 2006/111712 | * 10/2006 | ............. B01F 17/18 |

OTHER PUBLICATIONS

Converting oxazoles into imidazaoles: new opportunities for diversity-oriented synthesis, Chem. Commun., 2014, 50, 1867, Alzieu, et. al. (Year: 2014).*
Dandekar, "Petroleum Reservoir Rock and Fluid Properties," Taylor & Francis Group, LLC, (2010).
Hyne, "Dictionary of Petroleum Exploration, Drilling & Production", 2nd Edition:84 (2014).
Chopra et al. "Heavy Oils: Reservoir Characterization and Production Monitoring", Geophysical Developments 13:118 (2010).
"Manual of Applied Geology for Engineers", Institution of Civil Engineers (Great Britain), Section 5.2:78 (1976).

* cited by examiner

*Primary Examiner* — Aiqun Li
(74) *Attorney, Agent, or Firm* — Merchant & Gould P.C.

(57) ABSTRACT

The invention provides a wellbore fluid which comprises an aqueous continuous phase and, dissolved in said aqueous continuous phase, at least one salt which exists in a liquid state at a temperature below 150° C. and which has an ammonium, phosphonium or sulfonium cation containing at least 5 carbon atoms, or a quaternised nitrogen-containing heterocyclic cation containing at least 6 carbon atoms; provided that said salt is not 2-hydroxy-N,N,N-trimethyl ethanaminium acetate; and a method of carrying out a wellbore operation, which comprises introducing into a wellbore in a clay-containing formation, a wellbore fluid according to the invention. The described salts are effective shale inhibitors.

28 Claims, No Drawings

AQUEOUS-BASED WELLBORE FLUIDS

This application is a National Stage Application of PCT/GB2008/003956, filed 27 Nov. 2008, which claims benefit of Serial No. 07254745.8, filed 7 Dec. 2007 in Europe and which applications are incorporated herein by reference. To the extent appropriate, a claim of priority is made to each of the above disclosed applications.

The present invention relates to aqueous-based wellbore fluids having utility in the construction, repair or treatment of wellbores located in clay-containing formations, especially shale.

Conventionally, the drilling of a well into the earth by rotary drilling techniques, involves the circulation of a drilling fluid from the surface of the earth down a drill string having a drill bit on the lower end thereof and through ports provided in the drill bit to the well bottom and thence back to the surface through the annulus formed about the drill string. The drilling fluid serves to cool the drill bit, to transport drill cuttings to the surface, and to stabilize the wellbore.

Wellbore fluid compositions are flowable systems that are generally thickened to a limited extent. Known wellbore fluids can be assigned to one of the three following classes: wellbore fluids based on oil, which as a rule are used in the form of so-called invert emulsion fluids, and represent preparations of the water-in-oil emulsion type in which the aqueous phase is distributed as a heterogeneous fine dispersion in the continuous oil phase; purely aqueous-based wellbore fluids; and aqueous-based wellbore fluids of the oil-in-water emulsion type in which the oil phase is distributed as a heterogeneous fine dispersion in a continuous aqueous phase. A disadvantage of wellbore fluids based on oil is that the oil tends to coat the drill cuttings, which creates an environmental problem, especially in offshore drilling operations, when the drill cuttings are discarded. The present invention relates to improved aqueous-based systems, that is, systems having a continuous aqueous phase, including both purely aqueous-based fluids and oil-in-water emulsions.

Many oil wells are located in clay-containing formations. There are various different types of clay-rich rock, for example shale, mudstone or claystone, and other types containing smaller amounts of clay, for example sandstone. Such formations are often soft and therefore relatively easy to drill through. However, clay swells and disperses easily into aqueous-based wellbore fluids, large lumps may break off and fall into the wellbore, and in extreme cases the wellbore hole may collapse. For this reason, oil-based wellbore fluids are generally used when working in shale or other clay-containing rocks. Shale is a form of compacted clay, and in the oil industry the terms "shale" and "clay" are often used interchangeably. Additives known as "shale inhibitors" or "shale hydration inhibitors", i.e. additives which reduce the tendency of the shale/clay to swell and to disperse under the influence of the aqueous-based wellbore fluid, are frequently used in aqueous-based fluids. However, aqueous-based fluids remain generally less favoured than oil-based fluids, and there is a need for additional shale inhibitors which are capable of providing a more environmentally-friendly, aqueous-based wellbore fluid which is effective for use in clay-containing formations.

EP 545 677A describes well drilling fluids which reduce damage to water sensitive formations while drilling, containing an organic quaternary ammonium cation. The cation may be N,N,N-trimethylphenylammonium, N-methylpyridinium, N,N-dimethylmorpholinium, a $C_{1-4}$ alkyl quaternary ammonium cation of the 2 mole oligomers of epihalohydrin, or a series of defined quaternary ammonium cations. No mention is made of the relevance of the melting point of the salt.

It has now been found that the presence in an aqueous-based wellbore fluid of certain salts which are liquid at a temperature below 150° C., so-called "ionic liquids", provides improved inhibition.

Accordingly, the present invention provides a wellbore fluid which comprises an aqueous continuous phase and, dissolved in said aqueous continuous phase, at least one salt which exists in a liquid state at a temperature below 150° C. and which has an ammonium, phosphonium or sulfonium cation containing at least 5 carbon atoms, or a quaternised nitrogen-containing heterocyclic cation containing at least 6 carbon atoms; provided that said salt is not 2-hydroxy-N,N,N-trimethyl ethanaminium acetate.

Such salts are generally referred to as "ionic liquids". Being liquids, they present certain handling advantages, for example, they can be pumped rather than dosed as solids, and they are well able to withstand the high temperatures encountered downhole. Preferably the salt used in the present invention is a "room-temperature ionic liquid", i.e. one which is liquid at a temperature of 30° C.

The invention also provides a method of carrying out a wellbore operation, which comprises introducing into a wellbore in a clay-containing formation, a wellbore fluid according to the present invention. The method may be characterised as being a method of reducing the swelling of a clay-containing formation during a wellbore operation, or a method of stabilising a clay-containing formation during a wellbore operation.

Preferably said cation contains at least 8, preferably at least 12, carbon atoms.

The salt used in the present invention may contain an ammonium, phosphonium or sulfonium cation of the general formula $N^+R_aR_bR_cR_d$, $P^+R_aR_bR_cR_d$, or $S^+R_aR_bR_c$, respectively, where each of $R_a$ $R_b$ $R_c$ and $R_d$ (if present) is independently selected from hydrogen, an alkyl group having from 1 to 30, preferably from 1 to 20, for example 1 to 10, for example 1 to 4, carbon atoms, which may be optionally substituted by one or more substituents selected from hydroxy, carboxy, amine, amide, sulfate, cyanate and thiocyanate groups, and/or optionally interrupted by one or more, preferably 1, 2 or 3, oxygen atoms, or an aryl group. The groups $R_a$ $R_b$ $R_c$ and $R_d$ (if present) must in total contain at least 5, preferably at least 8, and preferably at least 12 carbon atoms. An uninterrupted alkyl group $R_a$ $R_b$ $R_c$ or $R_d$ preferably has up to 20 carbon atoms and is preferably unsubstituted or substituted by one or more hydrophilic groups, for example hydroxy or carboxy groups. Groups interrupted by one or more oxygen atoms, for example polyether groups, may also be unsubstituted or substituted by one or more hydrophilic groups, for example hydroxy or carboxy groups. Preferably not more than one of $R_a$, $R_b$, $R_c$ and $R_d$ (if present) is a hydrogen atom. The groups $R_a$ $R_b$ $R_c$ and $R_d$ (if present) may be the same or different, but preferably at least one of said groups is different from the other groups. For example, in a quaternary ammonium or phosphonium cation, three of $R_a$ $R_b$ $R_c$ and $R_d$ may be the same lower alkyl group, for example each may be a methyl group or each may be an ethyl group, while the remaining group is a larger group, for example an alkyl group having at least 4 carbon atoms, for example from 4 to 10 carbon atoms. Alternatively, three of $R_a$ $R_b$ $R_c$ and $R_d$ may be the same higher alkyl group, for example each may be a $C_{3-5}$ alkyl group, while the remaining group is a lower alkyl group, for example a methyl or ethyl group. Preferably, the cation is a quaternary phosphonium cation. The cation may for example be a tributyl(ethyl)phosphonium cation.

Alternatively, the cation which is present in the salt used in the present invention may comprise a nitrogen-containing heterocyclic ring system, preferably an aromatic nitrogen-containing heterocyclic ring system, in which a nitrogen atom forming part of said ring system is quaternised. The ring system suitably contains up to 14 atoms in the ring(s) and may be monocyclic, bicyclic or tricyclic, but is preferably monocyclic or bicyclic, especially monocyclic. Suitable ring systems include for example those derived from pyrrole, oxazole, thiazole, imidazole, pyridine, pyridazine, pyrimidine, pyrazine, triazine, indole, isoindole, indazole, benzimidazole, benzthiazole, purine, quinoline and isoquinoline. An especially preferred ring system is imidazole. The ring system may carry one or more substituents, for example $C_{1-6}$alkyl, cyano and carboxy groups.

The quaternising substituent on the nitrogen atom may, for example, be a hydrogen atom or an alkyl group having up to 16 carbon atoms optionally substituted by one or more of the same or different substituents selected from phenyl, carboxyl, amine, amide, sulfate, cyanate and thiocyanate groups and halogen atoms and optionally interrupted by one or more oxygen, nitrogen and/or sulfur atoms. Preferably the substituent is an unsubstituted alkyl group having up to 16 carbon atoms, preferably from 1 to 8 carbon atoms.

Specific examples of suitable cations include, for example, 1-alkyl-3-alkylimidazolium cations, where each alkyl group preferably has up to 10, especially up to 8, most preferably up to 4, carbon atoms, for example the 1-ethyl-3-methylimidazolium cation.

The salt used in the present invention may not be 2-hydroxy-N,N,N-trimethyl ethanaminium acetate, also known as choline acetate, and preferably the cation is not a choline cation. Preferably the cation is a quaternary phosphonium salt as described above, or an aromatic nitrogen-containing heterocyclic ring system, in which a nitrogen atom forming part of said ring system is quaternised, as described above, especially an imidazolium cation.

The nature of the anion present in the salt used in the present invention is not crucial, provided that the resulting salt is an ionic liquid and is soluble in the continuous phase of the wellbore fluid. Suitable anions include, for example, carboxylates (for example methanoate, ethanoate, trifluoroacetate, benzoate and lactate), sulfate, hydrogensulfate, alkyl, haloalkyl or aryl sulfates or sulfonates (for example methylsulfate, ethylsulfate, octylsulfate, methanesulfonate, trifluoromethanesulfonate and tosylate), phosphates, phosphinates or phosphonates (for example phosphate, dimethylphosphate, diethylphosphate and hexafluorophosphate), alkyl or haloalkyl sulfonylamides (for example trifluoromethanesulfonylamide or bistrifluoromethanesulfonylamide), nitrate, carbonate or alkylcarbonates (for example methylcarbonate), oxide anions (e.g. phenoxide), dicyanamide ($[C(CN)_2]^-$), azolates (for example 1,2,4-triazolate), halides, perhalides, pseudohalides (for example cyanate and thiocyanide), metal anions such as $[MCl_m]^-$ where M is gallium or indium, and various fluorinated anions (for example tetrafluoroborate, perfluoroalkylfluorophosphates, and fluorinated borates).

The salts used in the invention may be prepared by known methods. They may for example be prepared by quaternising an appropriate amine, phosphine, sulfide or heterocyclic compound, and if desired or required, subsequently replacing the anion in the resulting salt with a different anion. For example, an appropriately substituted amine, phosphine, sulfide or heterocycle may be reacted with an alkylating agent, such as an alkyl bromide, followed if desired by metathesis of the anion, to give the required salt. As a further example, methyl- and ethyl-substituted heterocyclic salts may be prepared by alkylation with dimethylsulfate and diethylsulfate respectively, typically in toluene at around 100° C.

The continuous phase of the fluid of the invention has the shale-inhibiting salt dissolved therein. It may also contain other dissolved salts. Typically, the continuous phase of an aqueous-based wellbore fluid will be based on seawater or a synthetic brine. Such brines typically contain salts selected from alkali metal halides; the alkaline earth metal halides; and sodium, potassium or caesium acetates or formates. Preferred salts include for example sodium chloride, potassium chloride, potassium formate or calcium chloride. Carbonate, sulfate, phosphate, silicate and citrate salts (among other polyvalent anions), for example of alkali metals, may also be used, as may mixtures of salts, or no salt at all. The total salt content will contribute to the density of the wellbore fluid, which is important for well-control purposes. Suitably, the specific gravity of the wellbore fluid is in the range 0.9 to 2.5, typically in the range 1.0 to 2.0. It is an advantage of the present invention that the shale-inhibiting salts do not, in general, have an adverse effect on the viscosity of the wellbore fluid, which means that the viscosity can be controlled by conventional means.

Glycols are common shale inhibitors for use in aqueous-based wellbore fluids. One disadvantage of the use of glycols is that inhibition in pure water or brines based on sodium chloride, as in seawater, is generally poor, and it is usually essential to use a synthetic brine containing a salt such as potassium chloride. The salts used in the present invention generally provide a good shale inhibiting effect even when pure water (useful for drilling on land) or a sodium chloride brine (e.g. seawater) is used, although naturally the nature of the water/brine should be optimised depending upon the exact nature of the shale-inhibiting salt.

The content of the shale-inhibiting salt in the wellbore fluid may vary over a wide range. It may for example be in the range of from 0.1 to 15%, for example 0.1 to 10%, preferably 1 to 5% weight/volume (i.e. g/100 ml total volume). At least some of the shale-inhibiting salt must be dissolved in the continuous aqueous phase; additional salt may if desired be present in solid form.

The fluid of the invention has a continuous aqueous phase. Thus, it may be either a purely aqueous based fluid, or an oil-in-water emulsion, i.e. an emulsion in which oil droplets are dispersed in an aqueous continuous phase. In the case of an oil-in-water emulsion, at least one emulsifier may be present, although the salt used in the present invention may in some cases act as an emulsifier. Suitable conventional emulsifiers would be well known to the person skilled in the art. In an emulsion, the oil phase is for example dispersed in the continuous aqueous phase in an amount of from 1 to 65% by volume, preferably 2.5 to 40% by volume, most preferably 10 to 35% by volume based on the total volume of the aqueous and oil phases. Generally, the oil phase is distributed in the aqueous phase in the form of finely divided droplets. Suitably, the droplets of oil phase have an average diameter of less than 40 microns, preferably between 0.5 and 20 microns, and most preferably between 0.5 and 10 microns.

The discontinuous oil phase of an oil-in-water emulsion may for example be a crude oil, a refined petroleum fraction, a mineral oil, a synthetic hydrocarbon, or any non-hydrocarbon oil that is capable of forming a stable emulsion with the continuous aqueous phase. Preferably, such a non-hydrocarbon oil is biodegradable and is therefore not associated with ecotoxic problems. It is particularly preferred that the non-hydrocarbon oil has a solubility in water at room temperature of less than 2% by weight, preferably, less than 1.0% by weight, most preferably, less than 0.5% by weight.

Preferably however, the fluid according to the invention is an entirely aqueous-based system, in which case the aqueous base fluid comprises a solution of the shale-inhibiting salt in water or a brine, insubstantial amounts, or no, oil being present.

Typically, the wellbore fluid is a drilling fluid, completion fluid, lost-circulation control fluid, workover fluid, packer fluid, or hydraulic fracturing fluid. Preferably the wellbore fluid is a drilling or completion fluid. The wellbore fluid may, of course, contain conventional additives of the type generally used in such fluids. Such additives include, for example, additives for increasing the density of the fluid, polymeric viscosifiers, thinners, fluid loss reducers, conventional shale inhibitors, e.g. glycols, lubricants, surfactants, and particulate solids such as bridging solids or weighting agents such as barite (barium sulfate). The quantity of auxiliary substances and additives used in each case lie within the usual boundaries for a wellbore fluid. It is an advantage of the salts used in the present invention that they are in general compatible with conventional additives used in wellbore fluids, for example fluid loss additives, and they generally do not have an extreme effect on pH, enabling conventional means of pH adjustment to be used.

The following Examples illustrate the invention. In all cases, the results are expressed in terms of recovered weight of dried clay, calculated by taking into account the previously found water content of the original clay sample.

EXAMPLE 1

16.5 grams of 1-ethyl-3-methylimidazolium chloride was dissolved in 285 ml of distilled water to produce the "inhibitive solution" (approximately 5 weight % in 1-ethyl-3-methylimidazolium chloride). 10.0 grams of London clay chippings, with particle size range between 4.0 mm and 2.0 mm, was placed in a 110 ml glass sample bottle, and 100 grams of the previously prepared solution (5 weight % 1-ethyl-3-methylimidazolium chloride) was added. The sample bottle was then sealed, and placed on a rolling table for 24 hours at room temperature. After 24 hours, the sample was filtered through a 500 micrometer sieve and washed with a KCl/water solution (42.75 grams KCl/litre). The sieve containing the recovered clay particles was then placed in a drying oven overnight (at 110° C.) and the recovered particles were then carefully weighed. The procedure was repeated three times, and the results averaged. 79% of clay was recovered, representing a high level of inhibition.

EXAMPLE 2

The method of Example 1 was repeated except that the 285 ml of distilled water was replaced by 285 ml of NaCl/water solution (71.3 grams NaCl in distilled water). A recovery of 75.0% was obtained.

EXAMPLE 3

The method of Example 1 was repeated except that the 285 ml of distilled water was replaced by 285 ml of KCl/water solution (71.3 grams KCl in distilled water). A recovery of 70.0% was obtained.

EXAMPLES 4 TO 8

The general method of Examples 1 was repeated using different salts, and using either distilled water, NaCl (71.43 g/l) solution, or KCl (71.43 g/l) solution. The results (% of recovered clay) are summarised in Table I.

TABLE I

| Example No. | Salt | Distilled water | NaCl solution | KCl solution |
|---|---|---|---|---|
| 4 (comparative) | Choline chloride | 36 | 37 | 33 |
| 5 (comparative) | tetrabutylammonium bromide | 66 | — | 58 |
| 6 | tributyl(ethyl)phosphonium diethylphosphate | 85 | 58 | 60 |
| 7 (comparative) | None | 1.8 | — | — |
| 8 (comparative) | sodium methylsulfate | 1 | — | — |

It can be seen that the compositions according to the invention exhibited a much higher degree of inhibition than a composition containing no inhibitor, or a composition containing a salt not according to the invention.

EXAMPLES 9 TO 12

The general method of Example 1 was repeated in a second series of experiments. The results—recovery of clay—are shown in Table II. Glycol DCP208 is a commercially-available shale inhibitor used in aqueous-based wellbore fluids.

TABLE II

| Example No. | Salt or other inhibitor | Distilled water | NaCl solution | KCl solution |
|---|---|---|---|---|
| 9 | tributyl(ethyl)phosphonium diethylphosphate | 74 | 71 | 75 |
| 10 | 1-ethyl-3-methylimidazolium ethylsulfate | 70 | 76 | 75 |
| 11 (comparative) | None | 1 | 0.2 | 0.6 |
| 12 (comparative) | Glycol DCP208 | 1 | 6 | 59 |

It can be seen that the compositions according to the invention exhibited a much higher degree of inhibition than a composition containing no inhibitor, or a composition containing a commercially used inhibitor. The commercially-used inhibitor, Glycol DCP208, required the presence of KCl to exhibit any inhibiting properties; the inhibitors according to the invention exhibited high levels of inhibition in all of water, KCl brine and NaCl brine.

EXAMPLES 13 TO 16

Cage rolling tests were carried out as follows. Around 100 g of 4-8 mm of London Clay chips were accurately weighed into rolling cages. The cages were rolled at 20 rpm for 4 hours at room temperature in 1500 ml of various test fluids, after which the cages were rinsed well with water to remove all traces of the test fluids from the surviving clay chips. The chips were dried at 130° C. for 16 hours, weighed, and the percentage recovery was calculated taking the original moisture content into account. The moisture content was 22.01%. The composition of the test fluids, which modelled wellbore fluids, are shown in Table III, and the results—recovery of clay—of the cage rolling tests are shown in Table IV.

TABLE III

| | |
|---|---|
| KCl | 0 or 129 g |
| Starch (Flotrol) | 129 g |
| PAC L | 4.3 g |
| XC polymer Duovis | 5.1 g |
| tributyl(ethyl)phosphonium diethylphosphate or 1-ethyl-3-methylimidazolium ethylsulfate | 75 ml |
| pH (adjusted with KOH) | 10 |
| Water | to 1500 ml |

TABLE IV

| Example No. | KCl | Salt | Clay recovery (wt %) |
|---|---|---|---|
| 13 | 0 | tributyl(ethyl)phosphonium diethylphosphate | 48 |
| 14 | 129 g | tributyl(ethyl)phosphonium diethylphosphate | 61 |
| 15 | 0 | 1-ethyl-3-methylimidazolium ethylsulfate | 64 |
| 16 | 129 g | 1-ethyl-3-methylimidazolium ethylsulfate | 72 |

The invention claimed is:

1. A method of carrying out a wellbore operation, which comprises introducing into a wellbore in a clay-containing formation, a wellbore fluid wherein the wellbore fluid is an entirely aqueous-based system and, dissolved in said aqueous-based system, at least one salt which exists in a liquid state at a temperature below 150° C. and which has a phosphonium or sulfonium cation containing at least 5 carbon atoms, or a quaternised nitrogen-containing heterocyclic cation containing at least 6 carbon atoms, wherein said cation comprises a substituted or unsubstituted pyrrole, oxazole, thiazole, pyridazine, pyrimidine, pyrazine, triazine, indole, isoindole, indazole, benzimidazole, benzthiazole, purine, quinoline or isoquinoline ring system with a quaternised nitrogen atom;

and wherein the phosphonium cation is of the general formula $P^+R_aR_bR_cR_d$, wherein each of $R_a$, $R_b$, $R_c$, and $R_d$, is independently selected from hydrogen or an alkyl group having from 1 to 30 carbon atoms, which may be optionally substituted by one or more substituents selected from hydroxy, amine, amide, sulfate, cyanate and thiocyanate groups, and/or optionally interrupted by one or more oxygen atoms, or an aryl group.

2. The method of claim 1, wherein said phosphonium, sulfonium, or quaternised nitrogen-containing heterocyclic cation contains at least 8 carbon atoms.

3. The method of claim 2, wherein said phosphonium, sulfonium, or quaternised nitrogen-containing heterocyclic cation contains at least 12 carbon atoms.

4. The method of claim 1, in which said salt contains a phosphonium cation as defined in claim 1 or sulfonium cation of the general formula $S^+R_aR_bR_c$, wherein each of $R_a$, $R_b$, and $R_c$, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group.

5. The method of claim 4, (i) wherein the cation is a phosphonium cation as defined in claim 1 and in which any uninterrupted alkyl group Ra, Rb, Rc, or Rd has up to 20 carbon atoms and is unsubstituted or substituted by one or more hydroxy groups, and any alkyl group interrupted by one or more oxygen atoms is optionally substituted by one or more hydroxy groups; or (ii) wherein the cation is a sulfonium cation as defined in claim 4, and in which any uninterrupted alkyl group $R_a$, $R_b$, or $R_c$ has up to 20 carbon atoms and is unsubstituted or substituted by one or more hydroxy or carboxy groups, and any alkyl group interrupted by one or more oxygen atoms is optionally substituted by one or more hydroxy or carboxy groups.

6. The method of claim 1, wherein said salt contains a quaternary phosphonium cation having three methyl groups or three ethyl groups and one alkyl group having at least 4 carbon atoms; or said salt contains a quaternary phosphonium cation having three identical $C_{3-5}$ alkyl groups and either a methyl or an ethyl group.

7. The method of claim 1, wherein said salt contains a quaternary phosphonium cation.

8. The method of claim 1, wherein the quaternising substituent on the nitrogen atom of the heterocycle is a hydrogen atom or an alkyl group having up to 16 carbon atoms optionally substituted by one or more of the same or different substituents selected from phenyl, carboxyl, amine, amide, sulfate, cyanate and thiocyanate groups and halogen atoms and optionally interrupted by one or more oxygen, nitrogen and/or sulfur atoms.

9. The method of claim 8, in which said substituent is an unsubstituted alkyl group having from 1 to 8 carbon atoms.

10. The method of claim 1, in which said cation is tributyl(ethyl)phosphonium.

11. The method of claim 1, wherein said salt exists in a liquid state at a temperature below 30° C.

12. The method of claim 1, wherein the salt is dissolved in water or a sodium chloride brine.

13. A method of inhibiting shale, comprising introducing into a wellbore in a clay-containing formation, a wellbore fluid wherein the wellbore fluid is an entirely aqueous-based system and, dissolved in said aqueous-based system, at least one salt which exists in a liquid state at a temperature below 150° C. and which has a phosphonium or sulfonium cation containing at least 5 carbon atoms, or a quaternised nitrogen-containing heterocyclic cation containing at least 6 carbon atoms, wherein said cation comprises a substituted or unsubstituted pyrrole, oxazole, thiazole, pyridazine, pyrimidine, pyrazine, triazine, indole, isoindole, indazole, benzimidazole, benzthiazole, purine, quinoline or isoquinoline ring system with a quaternised nitrogen atom;

and wherein the phosphonium cation is of the general formula $P^+R_aR_bR_cR_d$, wherein each of $R_a$, $R_b$, $R_c$, and $R_d$, is independently selected from hydrogen or an alkyl group having from 1 to 30 carbon atoms, which may be optionally substituted by one or more substituents selected from hydroxy, amine, amide, sulfate, cyanate and thiocyanate groups, and/or optionally interrupted by one or more oxygen atoms, or an aryl group.

14. The method of claim 13, wherein said phosphonium, sulfonium, or quaternised nitrogen-containing heterocyclic cation contains at least 8 carbon atoms.

15. The method of claim 14, wherein said phosphonium, sulfonium, or quaternised nitrogen-containing heterocyclic cation contains at least 12 carbon atoms.

16. The method of claim 13, in which said salt contains a phosphonium cation as defined in claim 13, or sulfonium cation of the general formula $S^+R_aR_bR_c$, wherein each of $R_a$, $R_b$, or $R_c$, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group.

17. The method of claim 16, (i) wherein the cation is a phosphonium cation as defined in claim 13, and in which any uninterrupted alkyl group $R_a$, $R_b$, $R_c$, or $R_d$ has up to 20 carbon atoms and is unsubstituted or substituted by one or more hydroxy groups, and any alkyl group interrupted by one or more oxygen atoms is optionally substituted by one or more hydroxy groups; or (ii) wherein the cation is a sulfonium cation as defined in claim 16, and in which any uninterrupted alkyl group $R_a$, $R_b$, or $R_c$ has up to 20 carbon atoms and is unsubstituted or substituted by one or more hydroxy or carboxy groups, and any alkyl group interrupted by one or more oxygen atoms is optionally substituted by one or more hydroxy or carboxy groups.

18. The method of claim 16, wherein said salt contains a quaternary phosphonium cation having three methyl groups or three ethyl groups and one alkyl group having at least 4 carbon atoms; or said salt contains a quaternary phosphonium cation having three identical $C_{3-5}$ alkyl groups and either a methyl or an ethyl group.

19. The method of claim 13, wherein said salt contains a quaternary phosphonium cation.

20. The method of claim 13, wherein the quaternising substituent on the nitrogen atom of the heterocycle is a hydrogen atom or an alkyl group having up to 16 carbon atoms optionally substituted by one or more of the same or different substituents selected from phenyl, carboxyl, amine, amide, sulfate, cyanate and thiocyanate groups and halogen atoms and optionally interrupted by one or more oxygen, nitrogen and/or sulfur atoms.

21. The method of claim 20, in which said substituent is an unsubstituted alkyl group having from 1 to 8 carbon atoms.

22. The method of claim 13, in which said cation is tributyl(ethyl)phosphonium.

23. The method of claim 13, wherein said salt exists in a liquid state at a temperature below 30° C.

24. The method of claim 13, wherein the salt is dissolved in water or a sodium chloride brine.

25. The method of claim 1, wherein the cation is selected from (i) a quaternised nitrogen-containing heterocyclic cation as defined in claim 1; (ii) a sulphonium cation of the general formula S+RaRbRcRd, respectively, wherein each of Ra, Rb, Rc, and Rd, if present, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group; or (iii) a phosphonium cation of the general formula P+RaRbRcRd, respectively, wherein each of Ra, Rb, Rc, and Rd, if present, is independently selected from hydrogen or an alkyl group having from 1 to 30 carbon atoms.

26. The method of claim 1, wherein the cation is selected from (i) a sulphonium cation of the general formula S+RaRbRcRd, respectively, wherein each of Ra, Rb, Rc, and Rd, if present, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group; or (ii) a phosphonium cation of the general formula P+RaRbRcRd, respectively, wherein each of Ra, Rb, Rc, and Rd, if present, is independently selected from hydrogen or an alkyl group having from 1 to 30 carbon atoms.

27. The method of claim 13 wherein the cation is selected from (i) a quaternised nitrogen-containing heterocyclic cation as defined in claim 13; (ii) a sulphonium cation of the general formula S+RaRbRcRd, respectively, wherein each of Ra, Rb, Rc, and Rd, if present, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group; or (iii) a phosphonium cation of the general formula P+RaRbRcRd, respectively, wherein each of Ra, Rb, Rc, and Rd, if present, is independently selected from hydrogen or an alkyl group having from 1 to 30 carbon atoms.

28. The method of claim 13, wherein the cation is selected from (i) a sulphonium cation of the general formula S+RaRbRcRd, respectively, wherein each of Ra, Rb, Rc, and Rd, if present, is independently selected from hydrogen or an alkyl group having from 1 to 30 carbon atoms, which may be optionally substituted by one or more substituents selected from hydroxy, carboxy, amine, amide, sulfate, cyanate and thiocyanate groups, and/or optionally interrupted by one or more oxygen atoms, or an aryl group; or (ii) a phosphonium cation of the general formula P+RaRbRcRd, respectively, wherein each of Ra, Rb, Rc, and Rd, if present, is independently selected from hydrogen or an alkyl group having from 1 to 30 carbon atoms.

\* \* \* \* \*